United States Patent
Chandrasekaran et al.

(10) Patent No.: US 10,438,171 B2
(45) Date of Patent: Oct. 8, 2019

(54) METHOD AND SYSTEM FOR REAL-TIME HUMAN RESOURCE ACTIVITY IMPACT ASSESSMENT AND REAL-TIME IMPROVEMENT

(71) Applicant: Tata Consultancy Services Limited, Mumbai (IN)

(72) Inventors: Ramkumar Chandrasekaran, Chennai (IN); Vivek Ravichandran, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 625 days.

(21) Appl. No.: 15/069,493

(22) Filed: Mar. 14, 2016

(65) Prior Publication Data
US 2017/0221001 A1    Aug. 3, 2017

(30) Foreign Application Priority Data
Jan. 28, 2016 (IN) .............................. 201621003069

(51) Int. Cl.
*G06Q 10/10* (2012.01)
*G06Q 50/20* (2012.01)
*G06Q 10/06* (2012.01)

(52) U.S. Cl.
CPC ..... *G06Q 10/105* (2013.01); *G06Q 10/06398* (2013.01); *G06Q 50/2057* (2013.01)

(58) Field of Classification Search
CPC ......................................... G06Q 10/00–50/00
(Continued)

(56) References Cited

U.S. PATENT DOCUMENTS 6,032,141 A * 2/2000 O'Connor ................ G09B 7/04
434/107
6,754,874 B1 * 6/2004 Richman ................ G06Q 10/10
715/205
(Continued)

FOREIGN PATENT DOCUMENTS

CN          104239994    12/2014
WO    WO 2008/136776    11/2008

OTHER PUBLICATIONS

Lant, Theresa K., and Amy E. Hurley. "A contingency model of response to performance feedback: Escalation of commitment and incremental adaptation in resource investment decisions." Group & Organization Management 24.4 (1999): 421-437. (Year: 1999).*

(Continued)

*Primary Examiner* — Alan S Miller
(74) *Attorney, Agent, or Firm* — Finnegan, Henderson, Farabow, Garrett & Dunner LLP

(57) ABSTRACT

A method and system is provided for real-time human resource activity impact assessment and real-time improvement. The present application provides a method and system for real-time human resource activity impact assessment and real-time improvement comprises of categorizing activity target parameters in a data set; assigning a real time target to the human resource management (HRM) associate; converting the intangible aspect of the assigned target to tangible aspect; initiating the real time feedback implemented session and generating an alert by HRM associate; receiving the alert and registration by the users for the session; displaying in session, a real time synchronized feedback window; capturing feedback provided by the users; implementing captured feedback and modifying the session in real time; calculating an activity target achievement score of the session; and computing the activity assessment and improve- (Continued)

ment by calculating overall target achieved score and ranking the associate based on the computed achieved target parameters.

12 Claims, 5 Drawing Sheets

(58) Field of Classification Search
USPC .................................................. 705/7.11–7.42
See application file for complete search history.

(56) References Cited

U.S. PATENT DOCUMENTS

| | | | | |
|---|---|---|---|---|
| 6,944,596 | B1* | 9/2005 | Gray | G06Q 10/1053 434/107 |
| 7,337,120 | B2* | 2/2008 | Andrus | G06Q 10/10 705/1.1 |
| 7,483,842 | B1* | 1/2009 | Fung | G06Q 30/02 705/7.14 |
| 8,041,598 | B1* | 10/2011 | Russell | G06Q 10/00 705/7.42 |
| 8,073,724 | B2* | 12/2011 | Harthcryde | G06Q 10/00 705/7.14 |
| 8,290,807 | B2* | 10/2012 | Al-Otaibi | G06Q 10/06 705/7.25 |
| 2002/0055870 | A1* | 5/2002 | Thomas | G06Q 10/06 705/7.14 |
| 2002/0069189 | A1* | 6/2002 | Bertrand | G06F 9/453 706/45 |
| 2002/0147632 | A1* | 10/2002 | Winham | G06Q 10/06 705/411 |
| 2003/0018487 | A1* | 1/2003 | Young | G06Q 10/0635 705/500 |
| 2003/0101091 | A1* | 5/2003 | Levin | G06Q 10/06398 705/7.42 |
| 2006/0233349 | A1* | 10/2006 | Cooper | H04M 3/5175 379/265.06 |
| 2007/0250377 | A1* | 10/2007 | Hill, Jr. | G06Q 10/00 705/7.13 |
| 2008/0152122 | A1* | 6/2008 | Idan | H04M 3/5175 379/265.07 |
| 2008/0243581 | A1* | 10/2008 | Jennings | G06Q 30/0203 705/7.12 |
| 2009/0043621 | A1* | 2/2009 | Kershaw | G06Q 10/06 705/7.16 |
| 2013/0171593 | A1 | 7/2013 | Gorman et al. | |
| 2013/0339270 | A1* | 12/2013 | Singh | G06Q 30/0281 705/346 |
| 2014/0058803 | A1 | 2/2014 | Humrichouse et al. | |

OTHER PUBLICATIONS

Pfau, Bruce, et al. "Does 360-degree feedback negatively affect company performance?." Hr magazine 47.6 (2002): 54-59. (Year: 2002).*

Bates, Reid A., and Elwood F. Holton III. "Computerized performance monitoring: A review of human resource issues." Human Resource Management Review 5.4 (1995): 267-288. (Year: 1995).*

* cited by examiner

METHOD AND SYSTEM FOR REAL-TIME HUMAN RESOURCE ACTIVITY IMPACT ASSESSMENT AND REAL-TIME IMPROVEMENT

PRIORITY CLAIM

This U.S. patent application claims priority under 35 U.S.C. § 119 to: India Application No. 201621003069, filed on Jan. 28, 2016. The entire contents of the aforementioned application are incorporated herein by reference.

TECHNICAL FIELD

The present application generally relates to human resource performance measurement in real-time. Particularly, the application provides a method and system for real-time human resource activity impact assessment and real-time improvement.

BACKGROUND

The vision of an organization drives and focuses organizational resources in a specific direction to achieve the vision. It is not only necessary to have a great organizational vision but also the vision should be clearly articulated, understood and deployed into meaningful objectives at each level of the organization hierarchy in order to attain its desired objectives. A significant number of organizations encounter practical organizational difficulties in the process of cascading the organizational vision down the hierarchy, where the measurement of goals at each level of the organization hierarchy are not measured properly and in-real time.

Typically, higher levels of management are relatively clearer about the organizational vision and objectives, but these vision and objectives are gradually diluted as they are cascaded down the organization hierarchy. In addition, there are also unclear performance accountabilities at various organizational levels, especially at lower staff levels, resulting in difficulties in effective performance management at various organizational levels. Thus, this may hamper the organizational ability in reaching the organization's vision, objectives and harness its business performance potential.

Performance appraisal for all staff at various levels of the organization has traditionally been a challenge to be transparent and balance, in terms of the tangible and intangible aspects of performance. Tangible performance aspect may cover concrete achievement of established objectives, such as sales and marketing target, etc. Intangible performance aspects are namely the demonstration of core values, in terms of staff attitude, training sessions with a real time feedback implementation mechanism and behaviors. These individual staff core values, when consolidated across the organizational, will form the true organizational culture of the organization. For the organization to create and sustain a desired culture based on the established core values of the organization, an objective staff attitude and behavior monitoring and feedback systems must be in place. In order to full engage all organizational staff towards their highest-level of performance and contribution to the organization, besides a clearly understood vision and objectives, the primary key is to have a transparent and balance performance appraisal systems.

Most organization performance management solutions in the market focus on management of tangible performance parameters, such as total number of new initiatives owned and implemented in human resource management of the organization, total number of experienced professionals offered against the assigned target, total percentage of associate connected against the assigned target of the human resource management associate, percentage completion of induction meetings, budgeting and forecasting. However, the intangible performance parameters of the human resource associate within the organization are not measurable properly and accurate measurement of achievement against targets is currently a challenge with existing systems as these measurements are not performed in real-time.

In addition, the business users and employees are becoming increasingly reliant on various types of wireless technologies such as smart-phones, tablet PCs, PDAs, and other similar devices as their primary lifestyle and workplace productivity tool. For example, devices such as the Blackberry, Android and iPhone smartphones provide millions of users with access to mobile, internet-connected content through standardized operating platforms. These smart-phones and other mobile devices (e.g., tablets, laptops PDAs) have evolved into complex computing devices with equally complex software that are used by individuals to perform and assist with a wide range of personal and work-related tasks. While many of these mobile devices continue to be used for various forms of communication (e.g., voice calls, e-mails, and text messaging) they also generally provide other various functionalities, including accessing and displaying websites, taking and displaying photographs and videos, playing music and other forms of audio, etc. In turn, the development and use of software applications designed specifically for operation and/or display on mobile devices, such as web applications accessed through a mobile web browser and mobile applications that run on mobile devices, has become widespread.

As a result, new approaches to measure the intangible activities performed by the Human resource associates of an organization by conducting training should take advantage of the extensive use of and reliance upon these mobile devices in order to maximize the effectiveness of, and participation in, the training programs. For example, one significant benefit associated with the use of mobile devices is the ability for employees to confirm participation and provide feedback in real time scenario.

Therefore, there is a need for a system and method to address the problems and difficulties within an organization to disseminate, review and monitor the performance of Human resource associates in real time by converting the intangible deliverables into a tangible points-based analytics system and implement the feedback raised by an associate for the task conducted by the Human resource associate in real time within the organization to improve the performance of Human resource associates at the organization level.

SUMMARY

Before the present methods, systems, and hardware enablement are described, it is to be understood that this invention is not limited to the particular systems, and methodologies described, as there can he multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present application provides a method and system for real-time human resource activity impact assessment and real-time improvement.

The present application provides a method for real-time human resource activity impact assessment and real-time improvement, said method comprising processor implemented steps of categorizing in a data set, a plurality of activity target parameters pertaining to a human resource management (HRM) associate wherein said plurality of activity target parameters are selected from a group comprises of a tangible aspect, an intangible aspect and a combination thereof, using a categorizing module (202); assigning a real time target to the human resource management associate using a real time target assignment module (204), wherein the real time target is selected from a group comprising of said tangible aspect, the intangible aspect and a combination thereof; converting the intangible aspect of the assigned target out of the human resource activity target parameters to tangible aspect using a granular point based metrics computation module (206) by selecting at least one intangible aspect of the assigned target out of the human resource activity target parameters; wherein said at least one intangible aspect is a real time feedback implemented talent engagement session; said real time feedback implemented talent engagement session comprises the steps of initiating the said real time feedback implemented talent engagement session and generating an alert by said human resource management associate using a first communication device (104-1 . . . N) for a plurality of users (306); receiving the alert by the plurality of users and subsequent registration for the real time feedback implemented talent engagement session using a second communication device (104-1 . . . N); displaying in session, a real time synchronized feedback window on the said first communication device (104-1 . . . N) of the human resource management associate and the second communication device of the registered user (304); capturing in-session real-time feedback provided by the plurality of registered users (308) to improve effectiveness of the real time feedback implemented talent engagement session; wherein the real time feedback is synchronized between the first communication device (104-1 . . . N) of the human resource management associate and the second communication device of the registered user (304); implementing said captured in-session real-time feedback and modifying the real time feedback implemented talent engagement session in real time using the in session real time feedback implementation module (310); calculating an activity target achievement score of the said in-session real time feedback implemented talent engagement session using a smart session management module (312); and computing the real-time human resource activity impact assessment and improvement by calculating overall target achieved score from plurality of activity target parameters and ranking the associate based on the computed achieved target parameters using an activity impact assessment and improvement computation module (208).

The present application provides a system for real-time human resource activity impact assessment and real-time improvement (200); said system (200) comprising a processor; a data bus coupled to said processor; and a computer-usable medium embodying computer code, said computer-usable medium being coupled to said data bus, said computer program code comprising instructions executable by said processor and configured for operating a categorizing module (202) adapted for categorizing in a data set, a plurality of activity target parameters pertaining to a human resource management (HRM) associate wherein said plurality of activity target parameters are selected from a group comprises of a tangible aspect, an intangible aspect and a combination thereof; a real time target assignment module (204) adapted for assigning a real time target to the human resource management associate, wherein the real time target is selected from a group comprising of said tangible aspect, the intangible aspect and a combination thereof; a granular point based metrics computation module (206) adapted for converting the intangible aspect of the assigned target out of the human resource activity target parameters to tangible aspect by selecting at least one intangible aspect of the assigned target out of the human resource activity target parameters; wherein said at least one intangible aspect is a real time feedback implemented talent engagement session; and an activity impact assessment and improvement computation module (208) adapted for computing the real-time human resource activity impact assessment and improvement by calculating overall target achieved score from plurality of activity target parameters and ranking the associate based on the computed achieved target parameters.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings.

DETAILED DESCRIPTION OF THE INVENTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
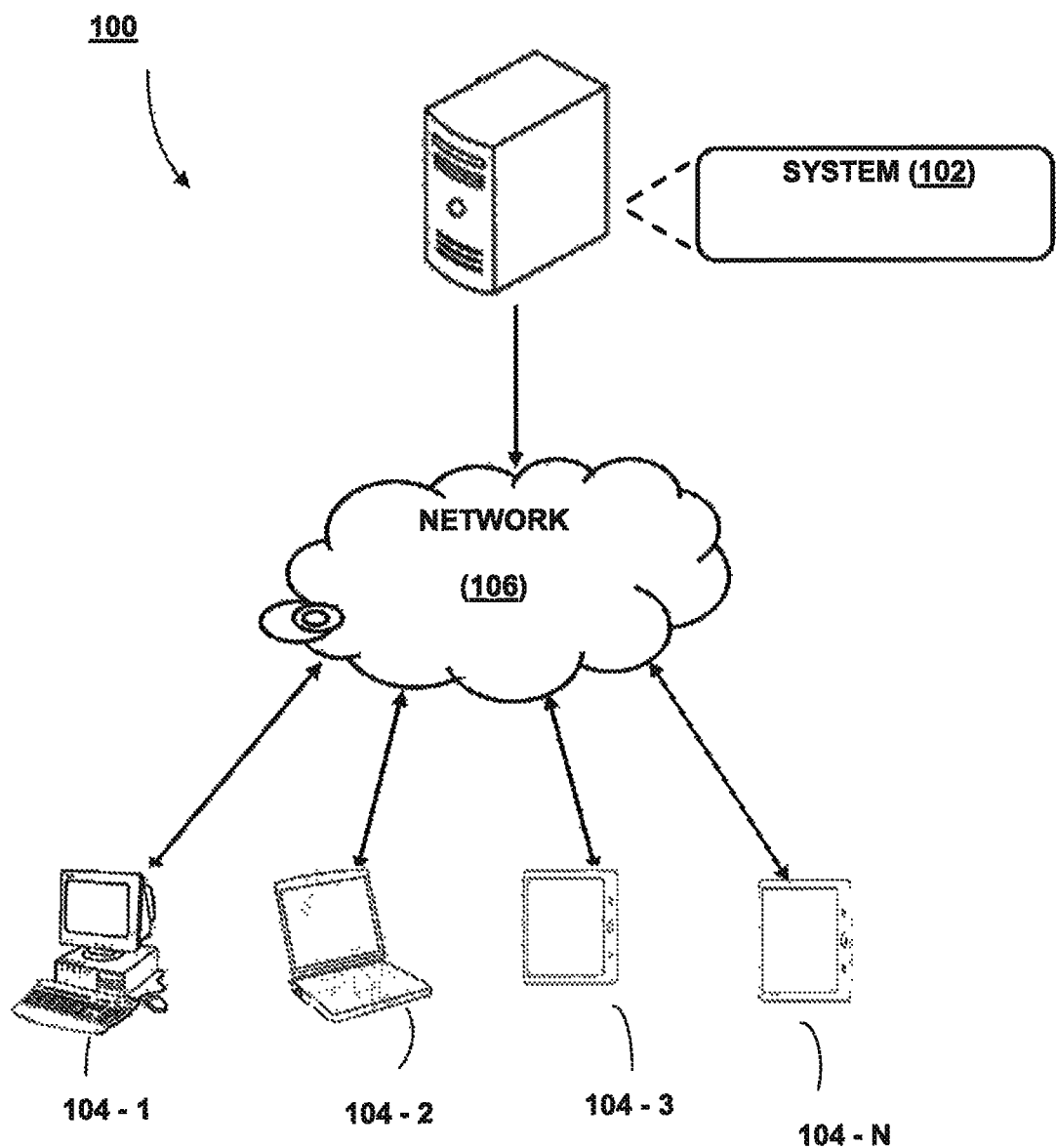
FIG. 1 illustrates a network implementation of a system for real-time human resource activity impact assessment and real-time improvement, in accordance with an embodiment of the present disclosure.

Referring to the drawings, FIG. 1 illustrates a network implementation 100 of a system 102 for real-time human resource activity impact assessment and real-time improvement, in accordance with an embodiment of the present disclosure. Although the present disclosure is explained by considering that system 102 is implemented as a software application on a server, it may be understood that system 102 may also be implemented in a variety of computing systems, such as a laptop computer, a desktop computer, a notebook, a workstation, a mainframe computer, a server, a network server, cloud, hand-held device and the like. It will be understood that system 102 may be accessed by multiple consumers through one or more user devices 104-1, 104-2 . . . 104-N, collectively referred to as user devices 104 hereinafter, or applications residing on user devices 104. Examples of user devices 104 may include, but are not limited to, a portable computer, a personal digital assistant, a hand-held device, and a workstation. The user devices 104 are communicatively coupled to system 102 through network 106.

In one implementation, network 106 may be a wireless network, a wired network or a combination thereof. Network 106 can be implemented as one of the different types of networks, such as intranet, local area network (LAN), wide area network (WAN), the internet, and the like. Network 106 may either be a dedicated network or a shared network. The shared network represents an association of the different types of networks that uses a variety of protocols, for example, Hypertext Transfer Protocol (HTTP), Transmission Control Protocol/Internet Protocol (TCP/IP), Wireless Application Protocol (WAP), and the like, to communicate with one another. Further network 106 may include a variety of network devices, including routers, bridges, servers, computing devices, storage devices, and the like.

Figure 2:
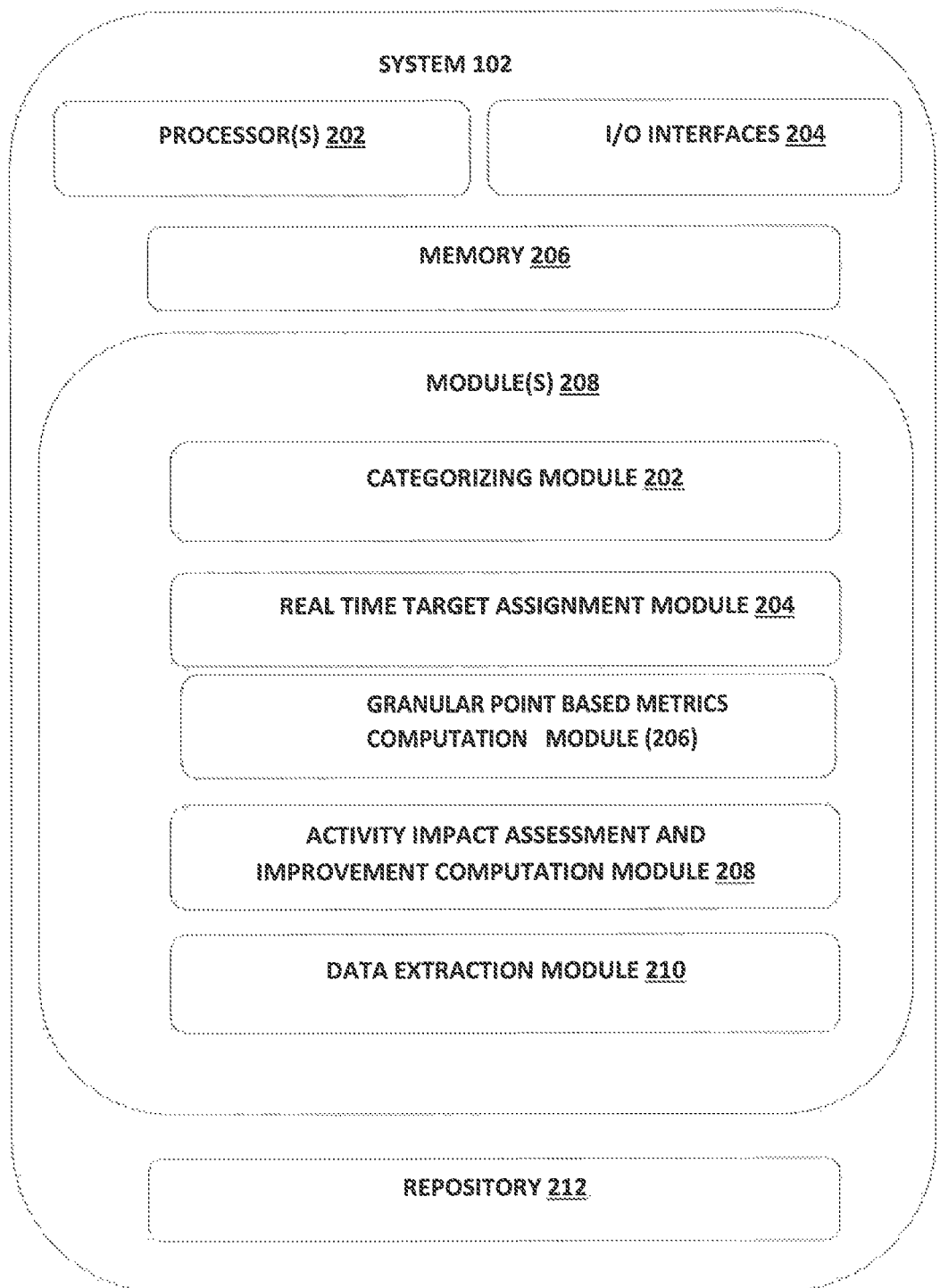
FIG. 2. illustrates a system architecture, in accordance with an embodiment of the present disclosure.

Referring to FIG. 2 is a block diagram illustrating system architecture for real-time human resource activity impact assessment and real-time improvement.

The system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

In an embodiment of the present invention, a system (102) is provided for real-time human resource activity impact assessment and real-time improvement. The system (102), comprising a categorizing module (202), a real time target assignment module (204), a granular point based metrics computation module (206), an activity impact assessment and improvement computation module (208), data extraction module (210) and a data repository (212).

In another embodiment of the present invention, the categorizing module (202) is adapted for categorizing activity target parameters pertaining to a human resource management (HRM) associate in a dataset. The activity target parameters are selected from corporate social responsibility, diversity and inclusion, wellness campaigns, safety campaigns, induction sessions, learning and development, policy awareness sessions and a combination.

In another embodiment of the present invention, the real time target assignment module (204) is adapted for assigning a real time target to the human resource management associate, wherein the real time target is selected from a group comprising of tangible aspect, the intangible aspect and a combination. The targets can be selected from a group comprising but not limiting to total number of new initiatives owned and implemented in human resource management of the organization, total number of experienced professionals offered against the assigned target, total percentage of associate connected against the assigned target of the human resource management associate, percentage completion of induction meetings and a combination thereof.

In another embodiment of the present invention, a granular point based metrics computation module (206) is adapted for converting the intangible aspect of the assigned target out of the human resource activity target parameters to tangible aspect by selecting at least one intangible aspect of the assigned target out of the human resource activity target parameters; wherein said at least one intangible aspect is a real time feedback implemented talent engagement session.

In another embodiment of the present invention, an activity impact assessment and improvement computation module (208) is adapted for computing the real-time human resource activity impact assessment and improvement by calculating overall target achieved score from plurality of activity target parameters and ranking the associate based on the computed achieved target parameters. The numeric value associated with the activity target achievement score is set as a positive or negative score for selected level of human resource management (HRM) in the organization, according to the achievement or the underachievement of the activity target parameter respectively and the overall achieved target percentage is summation of all the achieved targets set for and achieved by the selected level of human resource management (HRM) in the organization.

In another embodiment of the present invention, a data extraction module (210) is adapted for extracting the data of tangible and intangible aspects from the data repository (212). The data set is comprised of the plurality of activity target parameters pertaining to the human resource management (HRM) associate stored and maintained in data repository (212) further comprises of an annotation in a plurality of tables indicative of activity target parameters pertaining to activity target achievement or underachievement of the human resource management (HRM) associate.

Figure 3:
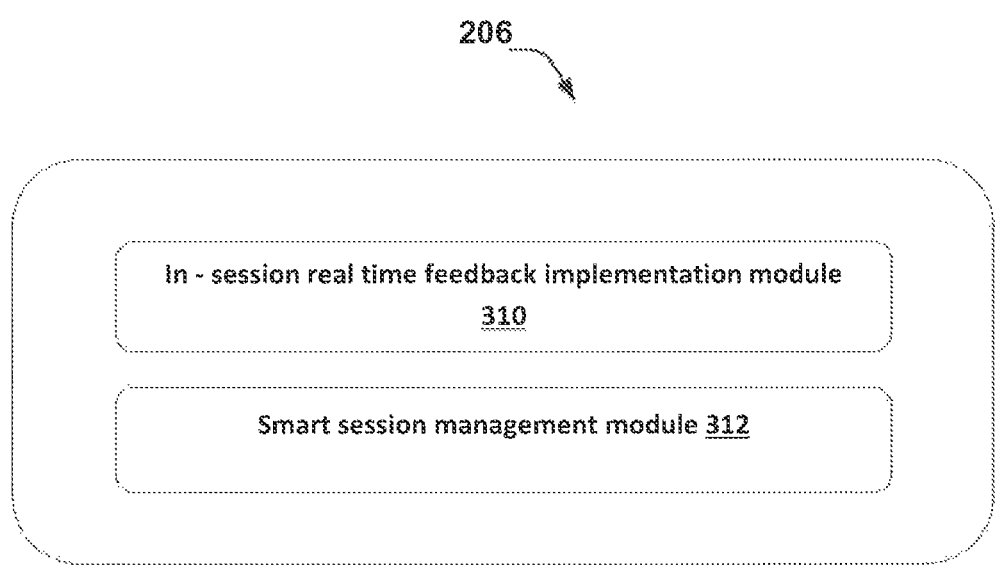
FIG. 3 illustrates a system architecture of granular point based metrics computation module, in accordance with an embodiment of the present disclosure.

FIG. 3 illustrates a system architecture of granular point based metrics computation module, in accordance with an embodiment of the present disclosure.

In another embodiment of the present invention, in session real time feedback implementation module (310) is adapted for implementing said captured in-session real-time feedback and modifying the real time feedback implemented talent engagement session in real time. The associate provides feedback on the content using his registered communication device which is synchronized with the device of the HRM associate. The devices are synchronized and thus real time data transfer takes place and the feedback is implemented in the same session in the real-time.

In another embodiment of the present invention, a smart session management module (312) is adapted for calculating an activity target achievement score of the said in-session real time feedback implemented talent engagement session. The associate provides the score at the end of the session using his registered communication device which is synchronized with the device of the HRM associate and this score is then further used for the overall calculation of the achieved target.

Figure 4:
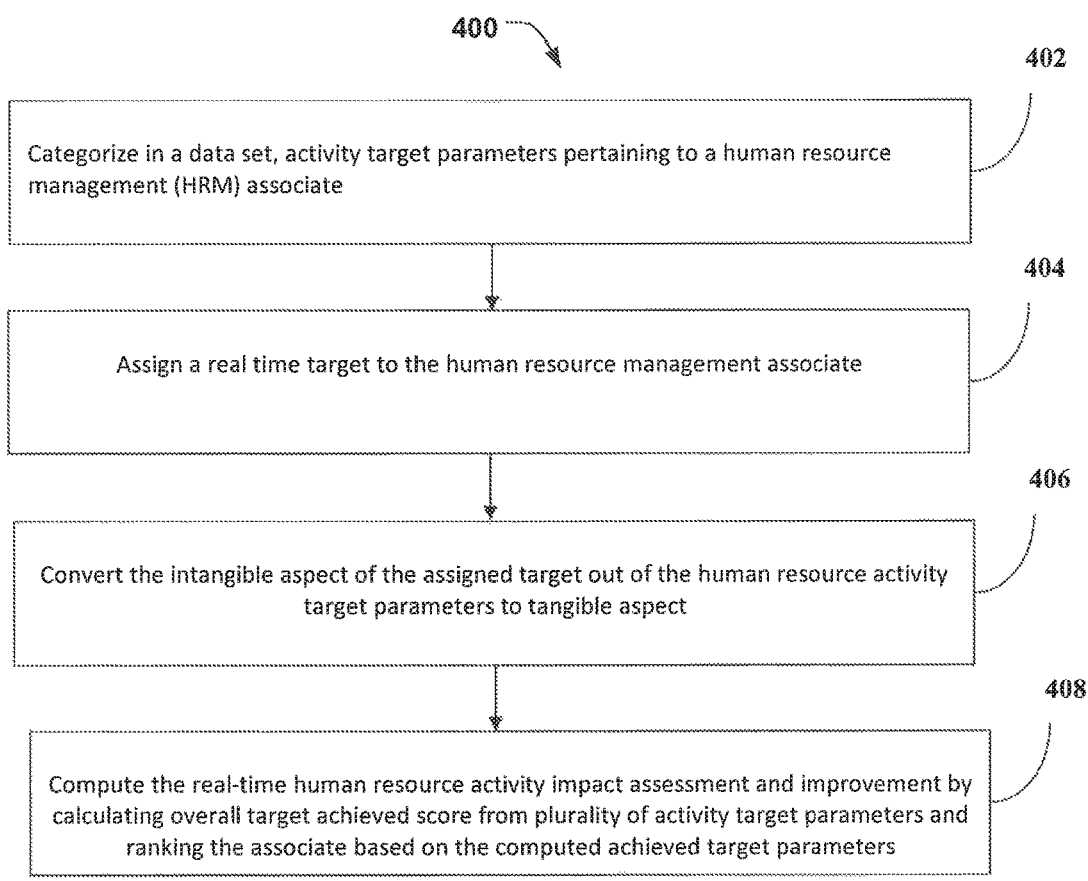
FIG. 4 illustrates an exemplary flow diagram illustrating a method for real-time human resource activity impact assessment and real-time improvement.

FIG. 4 illustrates an exemplary flow diagram illustrating a method for real-time human resource activity impact assessment and real-time improvement.

The process starts at step 402 wherein categorizing in a data set, a plurality of activity target parameters pertaining to a human resource management (HRM) associate wherein said plurality of activity target parameters are selected from a group comprises of a tangible aspect, an intangible aspect and a combination thereof using a categorizing module (202). At the step 404, the real time targets are assigned to the human resource management associate using a real time target assignment module (204). At the step 406, the intangible aspect of the assigned target out of the human resource activity target parameters to are converted to tangible aspect using a granular point based metrics computation module (206) by selecting at least one intangible aspect of the assigned target out of the human resource activity target parameters; wherein said at least one intangible aspect is a real time feedback implemented talent engagement session. The process ends at the step 408, the real-time human resource activity impact assessment and improvement is computed by calculating overall target achieved score from plurality of activity target parameters and ranking the associate based on the computed achieved target parameters using an activity impact assessment and improvement computation module (208).

Figure 5:
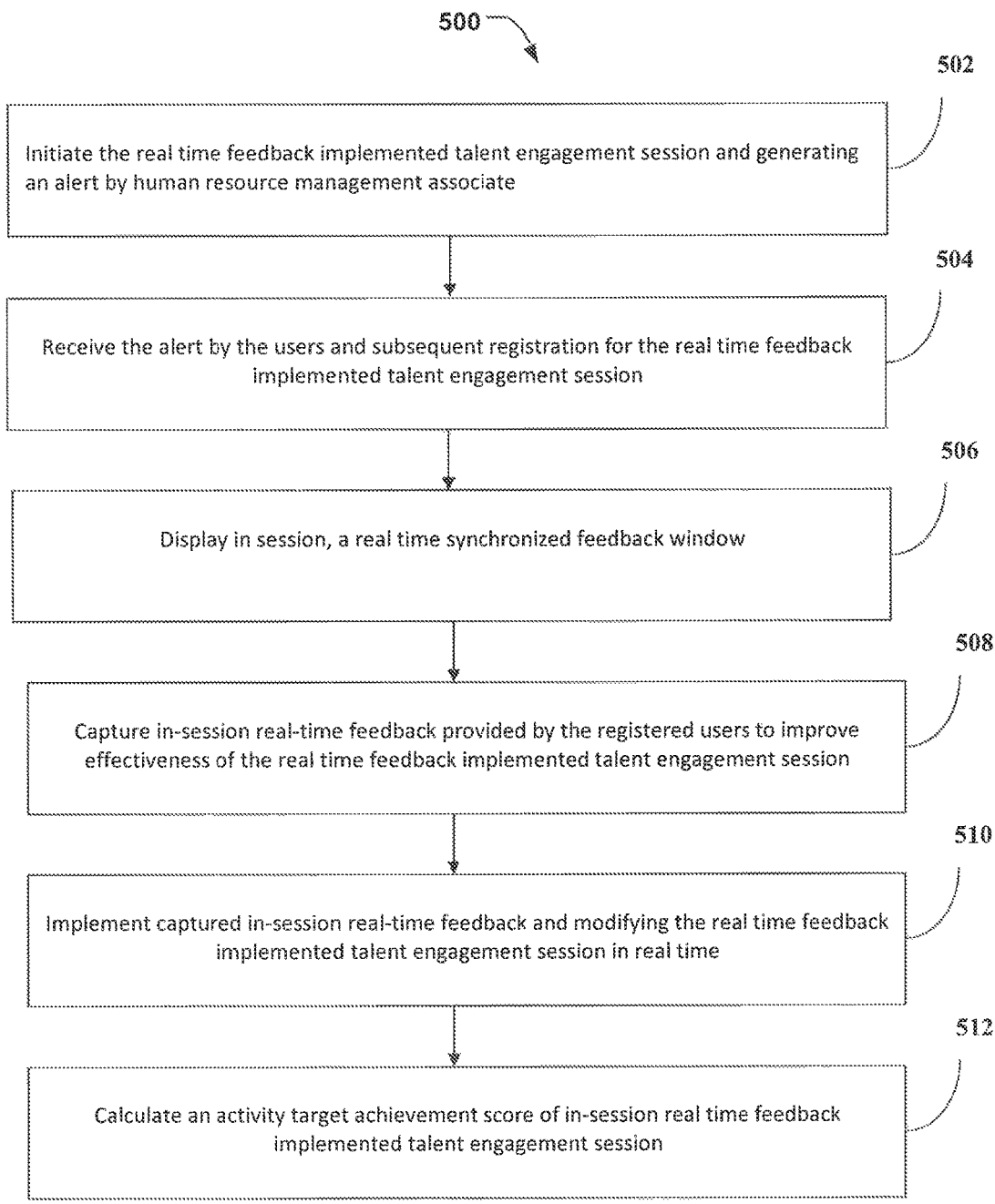
FIG. 5 illustrates an exemplary flow diagram illustrating a method for granular point based metrics computation for real-time human resource activity impact assessment and real-time improvement.

FIG. 5 illustrates an exemplary flow diagram illustrating a method for granular point based metrics computation for real-time human resource activity impact assessment and real-time improvement.

The process starts at step 502, wherein the real time feedback implemented talent engagement session is initiated and an alert is generated by said human resource management associate by a first communication device (104-1 . . . N) for a plurality of users (306). At step 504, the second communication device receives the alert by the plurality of users and the users are registered for the real time feedback implemented talent engagement session. At step 506, the first communication device of the human resource management associate and the second communication device of the registered user's displays in session, a real time synchronized feedback window. At step 508, the in-session real-time feedback provided by the plurality of registered users (308) is captured to improve effectiveness of the real time feedback implemented talent engagement session; wherein the real time feedback is synchronized between the first communication device (104-1 . . . N) of the human resource management associate and the second communication device of the registered user (304). At step 510, captured in-session real-time feedback is implemented and the session is modified in the real-time using the in session real time feedback implementation module (310) and at last step 512, the activity target achievement score of the said in-session real time feedback implemented talent engagement session is calculated using a smart session management module (312).

In another embodiment of the present invention, the assessment of the target is done on an entity level wherein selected entity level is ranked in the red zone representative of ranking low in the list of all entities being compared on the same level and meeting the overall target percentage; ranked in the amber zone representative of ranking medium in the list of all entities being compared on the same level and meeting the overall target percentage; and ranked in the green zone representative of ranking high in the list of all entities being compared on the same level and meeting the overall target percentage.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to he an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for real-time human resource activity impact assessment and real-time improvement, the method comprising:

categorizing in a data set, a plurality of activity target parameters pertaining to a human resource management (HRM) associate, wherein the plurality of activity target parameters are selected from a group comprising a tangible aspect, an intangible aspect and a combination thereof, via a hardware processor, wherein the data set comprising the plurality of activity target parameters pertaining to the human resource management (HRM) associate are stored and maintained in a repository and further comprises of an annotation in a plurality of tables indicative of activity target parameters pertaining to activity target achievement or underachievement of the human resource management (HRM) associate;

assigning, via the hardware processor, a real time target to the human resource management associate, wherein the real time target is selected from a group comprising the tangible aspect, the intangible aspect and the combination thereof;

converting, via the hardware processor, the intangible aspect of the assigned real time target out of the human resource activity target parameters to tangible aspect by selecting at least one intangible aspect of the assigned real time target out of the human resource activity target parameters, wherein the at least one intangible aspect is a real time feedback implemented talent engagement session, the real time feedback implemented talent engagement session comprises:

initiating the real time feedback implemented talent engagement session and generating an alert by the human resource management associate using a first communication device for a plurality of users;

receiving the alert by the plurality of users and subsequent registration for the real time feedback implemented talent engagement session using a second communication device;

displaying in session, a real time synchronized feedback window on the first communication device of the human resource management associate and the second communication device of the registered user;

capturing in-session real-time feedback provided by the plurality of registered users to improve effectiveness of the real time feedback implemented talent engagement session, wherein the real time feedback is synchronized between the first communication device of the human resource management associate and the second communication device of the registered user;

implementing, via the hardware processor, the captured in-session real-time feedback and modifying the real time feedback implemented talent engagement session in real time; and calculating, via the hardware processor, an activity target achievement score of the in-session real time feedback implemented talent engagement session; and computing, via the hardware processor, the real-time human resource activity impact assessment and improvement by calculating an overall target achieved score from the plurality of activity target parameters and ranking the human resource management associate based on the computed achieved target parameters.

2. The method of claim 1, wherein the plurality of activity target parameters pertaining to the human resource management (HRM) associate are selected from a group comprising of corporate social responsibility, diversity and inclusion, wellness campaigns, safety campaigns, induction sessions, learning and development, policy awareness sessions and a combination thereof.

3. The method of claim 1, wherein the real time target assigned to the human resource management associate is selected from a group comprising of total number of new initiatives owned and implemented in human resource management of the organization, total number of experienced professionals offered against the assigned target, total percentage of associate connected against the assigned target of the human resource management associate, percentage completion of induction meetings and a combination thereof.

4. The method of claim 1, wherein the activity target achievement score is accorded a predetermined default value for every activity target parameters pertaining to the human resource management (HRM) associate.

5. The method of claim 1, wherein the numeric value associated with the activity target achievement score is set as a positive or negative score for selected level of human resource management (HRM) in the organization, according to the achievement or the underachievement of the activity target parameter respectively.

6. The method of claim 1, wherein the overall achieved target percentage is summation of all the achieved targets set for and achieved by the selected level of human resource management (HRM) in the organization.

7. A system for real-time human resource activity impact assessment and real-time Improvement, the system comprising:

a hardware processor;
a data bus coupled to the hardware processor; and
a computer-usable medium embodying computer code, the computer-usable medium being coupled to the data bus, the computer program code comprising instructions executable by the hardware processor and configured for:

categorizing in a data set, a plurality of activity target parameters pertaining to a human resource management (HRM) associate, wherein the plurality of activity target parameters are selected from a group comprising a tangible aspect, an intangible aspect and a combination thereof, wherein the data set comprising the plurality of activity target parameters pertaining to the human resource management (HRM) associate are stored and maintained in a repository and further comprises of an annotation in a plurality of tables indicative of activity target parameters pertaining to activity target achievement or underachievement of the human resource management (HRM) associate;

assigning a real time target to the human resource management associate, wherein the real time target is selected from a group comprising the tangible aspect, the intangible aspect and the combination thereof;

converting the intangible aspect of the assigned real time target out of the human resource activity target parameters to tangible aspect by selecting at least one intangible aspect of the assigned real time target out of the human resource activity target parameters, wherein the at least one intangible aspect is a real time feedback implemented talent engagement session; and computing the real-time human resource activity impact assessment and improvement by calculating an overall target achieved score from the plurality of activity target parameters and ranking the human resource management associate based on the computed achieved target parameters.

8. The system of claim 7, wherein the hardware processor further comprises the real time feedback implemented talent engagement session as at least one intangible aspect, the hardware processor is configured for:

initiating the real time feedback implemented talent engagement session and generating an alert by the human resource management associate using a first communication device for a plurality of users;

receiving the alert by the plurality of users and subsequent registration for the real time feedback implemented talent engagement session using a second communication device;

displaying in session, a real time synchronized feedback window on the first communication device of the human resource management associate and the second communication device of the registered user;

capturing in-session real-time feedback provided by the plurality of registered users to improve effectiveness of the real time feedback implemented talent engagement session, wherein the real time feedback is synchronized between the first communication device of the human resource management associate and the second communication device of the registered user.

9. The system of claim 7, wherein the hardware processor is configured for implementing the captured in-session real-time feedback and modifying the real time feedback implemented talent engagement session in real time.

10. The system of claim 7, wherein the hardware processor is configured for calculating an activity target achievement score of the in-session real time feedback implemented talent engagement session.

11. The system of claim 7, further comprises a repository adapted for storing and maintaining the data set comprising the plurality of activity target parameters pertaining to the human resource management (HRM) associate.

12. A non-transitory computer readable medium comprising program codes executable by at least one processor for real-time human resource activity impact assessment and real-time improvement, the program codes comprising:

a program code for categorizing in a data set, a plurality of activity target parameters pertaining to a human resource management (HRM) associate, wherein the plurality of activity target parameters are selected from a group comprising a tangible aspect, an intangible aspect and a combination thereof, wherein the data set comprising the plurality of activity target parameters pertaining to the human resource management (HRM) associate are stored and maintained in a repository and further comprises of an annotation in a plurality of tables indicative of activity target parameters pertaining to activity target achievement or underachievement of the human resource management (HRM) associate;

a program code for assigning a real time target to the human resource management associate, wherein the real time target is selected from a group comprising the tangible aspect, the intangible aspect and the combination thereof;

a program code for converting the intangible aspect of the assigned target out of the human resource activity target parameters to tangible aspect by selecting at least one intangible aspect of the assigned real time target out of the human resource activity target parameters, wherein the at least one intangible aspect is a real time feedback implemented talent engagement session, the real time feedback implemented talent engagement session comprises:

initiating the real time feedback implemented talent engagement session and generating an alert by the human resource management associate using a first communication device for a plurality of users;

receiving the alert by the plurality of users and subsequent registration for the real time feedback implemented talent engagement session using a second communication device;

displaying in session, a real time synchronized feedback window on the first communication device of the human resource management associate and the second communication device of the registered user;

capturing in-session real-time feedback provided by the plurality of registered users to improve effectiveness of the real time feedback implemented talent engagement session, wherein the real time feedback is synchronized between the first communication device of the human resource management associate and the second communication device of the registered user;

implementing the captured in-session real-time feedback and modifying the real time feedback implemented talent engagement session in real time; and calculating an activity target achievement score of the in-session real time feedback implemented talent engagement session; and a program code for computing the real-time human resource activity impact assessment and improvement by calculating an overall target achieved score from the plurality of activity target parameters and ranking the human resource management associate based on the computed achieved target parameters.

* * * * *